United States Patent
Shimokawa et al.

(10) Patent No.: US 9,260,317 B2
(45) Date of Patent: Feb. 16, 2016

(54) METHOD FOR PRODUCING GRANULAR MATERIAL CONTAINING METAL OXIDE

(71) Applicant: Nippon Sheet Glass Company, Limited, Tokyo (JP)

(72) Inventors: Kosei Shimokawa, Mie (JP); Kazuhiro Doshita, Mie (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 0 days.

(21) Appl. No.: 14/408,857

(22) PCT Filed: Jul. 9, 2013

(86) PCT No.: PCT/JP2013/004245
§ 371 (c)(1),
(2) Date: Dec. 17, 2014

(87) PCT Pub. No.: WO2014/010230
PCT Pub. Date: Jan. 16, 2014

(65) Prior Publication Data
US 2015/0166359 A1 Jun. 18, 2015

(30) Foreign Application Priority Data
Jul. 10, 2012 (JP) ................ 2012-154748

(51) Int. Cl.
*B01D 9/00* (2006.01)
*C01G 23/04* (2006.01)
*C01B 13/36* (2006.01)
*C01B 33/18* (2006.01)

(52) U.S. Cl.
CPC ............ *C01G 23/04* (2013.01); *C01B 13/36* (2013.01); *C01B 33/18* (2013.01); *C01P 2004/03* (2013.01); *C01P 2004/50* (2013.01); *C01P 2004/61* (2013.01)

(58) Field of Classification Search
CPC .................................................... B01D 9/00
USPC ............................................................ 23/300
See application file for complete search history.

(56) References Cited

U.S. PATENT DOCUMENTS

| | | | |
|---|---|---|---|
| 5,294,237 A | 3/1994 | Mizuno et al. | |
| 6,291,535 B1 | 9/2001 | Watanabe et al. | |
| 2012/0323030 A1 | 12/2012 | Maehara et al. | |

FOREIGN PATENT DOCUMENTS

| | | |
|---|---|---|
| JP | 4-042828 | 2/1992 |
| JP | 7-315859 | 12/1995 |
| JP | 8-208213 | 8/1996 |
| JP | 2592307 B | 3/1997 |
| JP | 2861806 B | 2/1999 |
| JP | 2000-169133 | 6/2000 |
| JP | 3151620 B | 4/2001 |
| JP | 2004-224623 | 8/2004 |
| JP | 2006-076841 | 3/2006 |
| JP | 2007-297224 | 11/2007 |
| WO | 2011/102548 | 8/2011 |

*Primary Examiner* — Edward Johnson
(74) *Attorney, Agent, or Firm* — Hamre, Schumann, Mueller & Larson, P.C.

(57) ABSTRACT

The method of the present invention for producing a granular material containing a metal oxide includes the steps of feeding a metal oxide sol that contains colloidal particles of a metal oxide as a dispersoid and water as a dispersion medium and that has a pH of 7 or higher, into an aqueous electrolyte solution, so as to aggregate the colloidal particles of the metal oxide, form aggregates containing the metal oxide in the aqueous electrolyte solution, and make the aggregates settle out in the aqueous electrolyte solution; and separating the aggregates from the aqueous electrolyte solution after formation of the aggregates. Thus, a highly productive method for producing a granular material containing a metal oxide can be provided.

11 Claims, 10 Drawing Sheets

METHOD FOR PRODUCING GRANULAR MATERIAL CONTAINING METAL OXIDE

TECHNICAL FIELD

The present invention relates to a method for producing a granular material containing a metal oxide using as a raw material a metal oxide sol containing water as a dispersion medium.

BACKGROUND ART

Methods for producing a granular metal oxide material by a sol-gel process are commonly known. For example, silica flakes are produced by: 1) hydrolyzing and condensation-polymerizing a silicon alkoxide in an aqueous alcohol solution to form a silica sol; 2) applying the silica sol onto a substrate to form a thin film; and 3) peeling the thin film from the substrate. The use of an alkaline silica sol results in embrittlement of the thin film, leading to reduction in production yield. Therefore, an acidic silica sol is suitable for the above method.

The above silica flakes are called glass flakes, and used by being dispersed in a matrix formed of another material. For example, a resin molded body can be improved in its strength and dimensional accuracy by addition of glass flakes. There are also known bright pigments whose reflectivity has been increased by covering the surfaces of glass flakes with a film of metal or metal oxide. Bright pigments are blended with cosmetics, inks, etc., to enhance their commercial values.

The details of methods for producing glass flakes using a sol-gel process are disclosed, for example, in Patent Literature 1 to 4.

There has also been proposed a method including: hydrolyzing a metal alkoxide at an interface between two liquid phases, a phase of an aqueous medium and a phase of water-insoluble medium phase, thereby forming a ceramic thin film precursor; and sintering the obtained ceramic thin film precursor to obtain a ceramic thin film (see Patent Literature 5).

There has also been proposed a method including: partially hydrolyzing a chemically-modified metal alkoxide to form a polymer; dissolving the polymer in a solvent that is soluble in water to obtain a solution; spreading the solution on a water surface to form a gel nanosheet; drying and sintering the gel nanosheet to obtain an oxide ceramic nanosheet (see Patent Literature 6).

Granular silica materials account for the largest proportion of granular metal oxide materials actually mass-produced by sol-gel processes. However, sol-gel processes can be carried out also by using a metal alkoxide containing another metal element such as titanium or zirconium. The ultraviolet-shielding function and photocatalytic function of fine particles of titanium oxide obtained by sol-gel processes have been attracting attention.

CITATION LIST

Patent Literature

Patent Literature 1: JP 3151620 B2
Patent Literature 2: JP 2861806 B2
Patent Literature 3: JP 4-42828 A
Patent Literature 4: JP 7-315859 A
Patent Literature 5: JP 2592307 B2
Patent Literature 6: JP 2004-224623 A

SUMMARY OF INVENTION

Technical Problem

In the methods described in Patent Literature 1 to 4, it is necessary to apply a silica sol onto a substrate, and it is further necessary to peel a thin film formed on the substrate. Therefore, it is difficult to improve productivity by these methods. In the method described in Patent Literature 5, the size of the thin film of a ceramic precursor to be obtained is dependent on the area of the interface between the two liquid phases, the phase of the aqueous medium and the phase of the water-insoluble medium. In addition, it is necessary to pulverize the thin film of a ceramic precursor in order to fabricate a granular material. Therefore, this method has room for improvement in terms of the productivity of a granular metal oxide material. With the method described in Patent Literature 6, a nanosheet of oxide ceramic can be obtained; however, it is necessary to pulverize the nanosheet of oxide ceramic in order to fabricate a granular material. Therefore, this method has room for improvement in terms of the productivity of a granular metal oxide material.

In view of such circumstances, the present invention aims to provide a highly productive method for producing a granular material containing a metal oxide.

Solution to Problem

The present invention provides a method for producing a granular material containing a metal oxide, the method including the steps of feeding a metal oxide sol that contains colloidal particles of a metal oxide as a dispersoid and water as a dispersion medium and that has a pH of 7 or higher, into an aqueous electrolyte solution, so as to aggregate the colloidal particles of the metal oxide, form aggregates containing the metal oxide in the aqueous electrolyte solution, and make the aggregates settle out in the aqueous electrolyte solution; and separating the aggregates from the aqueous electrolyte solution after formation of the aggregates.

Advantageous Effects of Invention

As described later in detail, the production method of the present invention utilizes, as the granular material formation mechanism, a phenomenon in which, in the course of inter-diffusion between the metal oxide sol and the aqueous solution, the metal oxide colloidal particles aggregate together due to decrease in the electrical repulsion between the colloidal particles, and the aggregates settle out in the aqueous solution. According to this formation mechanism, when a metal oxide is fed into an aqueous electrolyte solution, colloidal particles of the metal oxide aggregate together, and a granular material containing the metal oxide is obtained. Therefore, application of the metal oxide sol to a substrate is unnecessary for producing the granular metal oxide material. Furthermore, since the granular metal oxide material can be fabricated without performing a pulverization step, the productivity of the granular metal oxide material is high.

DESCRIPTION OF EMBODIMENTS

Figure 1:
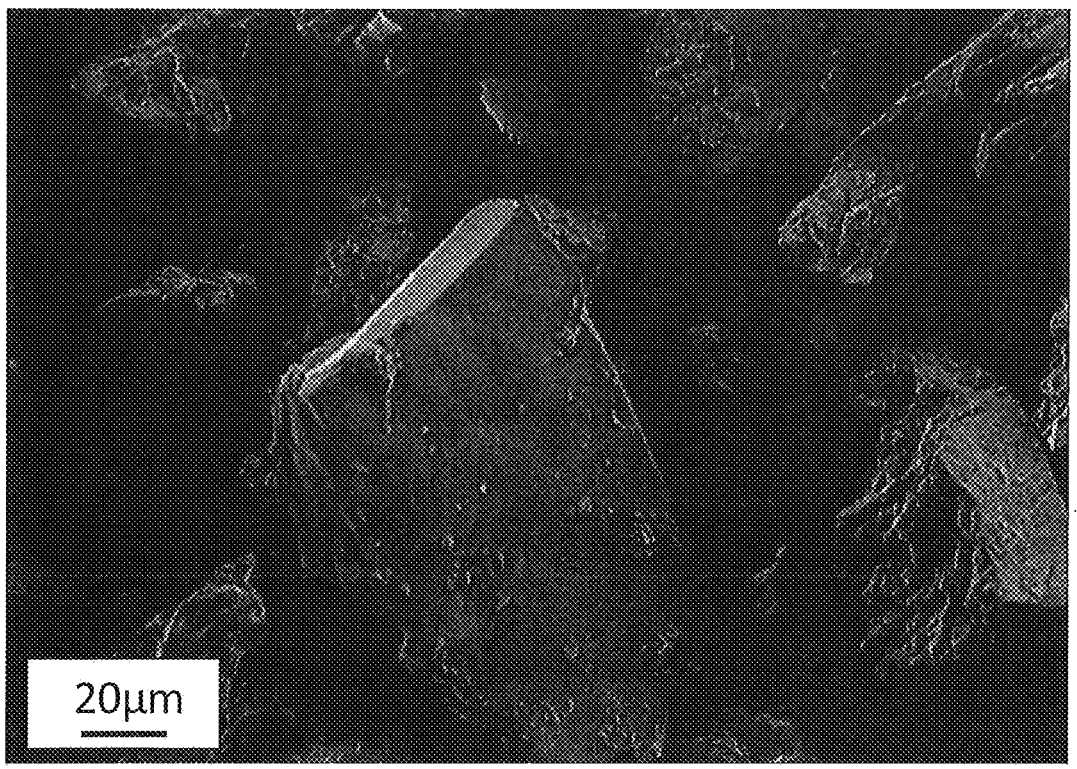
FIG. 1 is a photograph of a granular material according to Example 1 taken by a SEM (scanning electron microscope).

First, the mechanism of formation of a granular material containing a metal oxide in the production method of the present invention will be described.

When a metal oxide sol containing water as a dispersion medium is fed into an aqueous electrolyte solution, interdiffusion between the liquid phases starts at the interface between the sol and the aqueous solution having received the sol. Ions generated by dissociation of the electrolyte are present in the aqueous solution. These ions neutralize the surface charges of the colloidal particles of the sol, the electrical repulsion between the colloidal particles reduces, and the colloidal particles aggregate together, so that aggregates containing the metal oxide are formed. When the aggregates grow into such a large size that they cannot be dispersed in the aqueous solution, these aggregates settle out in the aqueous solution. These aggregates are separated from the aqueous solution, and thus a granular material containing the metal oxide is obtained.

It is also conceivable to form aggregates of a metal oxide by introducing an electrolyte or an aqueous electrolyte solution to a metal oxide sol. However, a certain length of time is required for the electrolyte or ions derived from the electrolyte to uniformly diffuse in the metal oxide sol to which the electrolyte or the aqueous electrolyte solution is introduced. The larger the amount of the metal oxide sol and the aqueous electrolyte solution which are mixed together, the longer the time required for the uniform diffusion of the electrolyte. Therefore, there is a possibility that the aggregates formed vary in size or shape depending on the position of the metal oxide sol to which the electrolyte or the aqueous electrolyte solution is introduced, for example. By contrast, when a metal oxide sol is introduced to an aqueous solution in which an electrolyte is uniformly dissolved beforehand, the aggregates formed are more likely to be uniform in size and shape. In the method according to the present invention, therefore, a metal oxide sol is fed to an aqueous electrolyte solution.

Generally, in an acidic metal oxide sol, the colloidal particles cannot approach each other due to the effect of hydration energy and are in a stable state. Therefore, in an acidic metal oxide sol, the aggregation of colloidal particles due to reduction in electrical repulsion is less likely to be caused by addition of a small amount of electrolyte. By contrast, in an alkaline metal oxide sol, the influence of the hydration energy is small, and the colloidal particles are stabilized by electrical double layers formed on the surfaces of the colloidal particles and represented by -MO—$H^+$ and -MO—$R^+$ (where M is a metal element such as Si, Ti, and Zr, and R is an alkali metal element typified by Na). Therefore, in an alkaline metal oxide sol, the repulsion between the colloidal particles is sufficiently reduced even by addition of a relatively small amount of electrolyte so that the aggregates of the metal oxide are formed. In order for the amount of the added electrolyte in an aqueous solution to be relatively small, it is desirable to use an alkaline metal oxide sol. Strictly speaking, the sol whose colloidal particles are to be aggregated does not need to be alkaline, and it is sufficient for the sol to have a pH of 7 or more.

Hereinafter, embodiments of the steps constituting the production method of the present invention will be described.

As is well known, a metal oxide sol can be prepared by hydrolyzing a metal alkoxide. Alternatively, a prepared metal oxide sol which is commercially-available may be used. In either case, a sol having a pH of 7 or more needs to be prepared. The pH of the sol may be selected as appropriate within a suitable range depending on the type of the metal oxide or the like, and is, for example, 7.5 or more, and particularly preferably 8 to 12. The metal oxide colloidal particles which are components of the metal oxide sol are, for example, colloidal particles of at least one selected from silicon oxide, titanium oxide, zirconium oxide, aluminum oxide, tantalum oxide, niobium oxide, cerium oxide, and tin oxide. A metal oxide sol in which two or more types of colloidal particles are present, or a mixture of two or more types of metal oxide sols, may also be used as long as aggregation of the metal oxide colloidal particles does not occur.

The electrolyte to be added to water is a compound composed of a positive ion and a negative ion combined by an ionic bond or is a hydrate of such a compound. The positive ion which is a component of the electrolyte is, for example, a positive ion having a valency of 1 to 3. Examples thereof include alkali metal ions, alkaline-earth metal ions, aluminum ion, copper ion, divalent or trivalent iron ion, silver ion, and ammonium ion. Examples of the negative ion which is a component of the electrolyte include chloride ion, acetate ion, nitrate ion, sulfate ion, citrate ion, and tartrate ion.

Examples of the electrolyte to be added to water include NaCl, $CaCl_2$, $CH_3COONa$, $NaNO_3$, KCl, $(CH_3COO)_2Mg.4H_2O$, and KNOB. However, the electrolyte used in the method of the present invention is not limited to these electrolytes. The electrolyte to be added may be at least one selected from NaCl, $CaCl_2$, $CH_3COONa$, $NaNO_3$, KCl, $(CH_3COO)_2Mg.4H_2O$, and $KNO_3$. Two or more of these electrolytes may be contained, or an electrolyte other than these may be contained.

In order to form a granular material by the above mechanism, it is preferable to use an aqueous solution containing an electrolyte added in an amount of 0.3 parts by weight or more per 100 parts by weight of water. If the amount of the added electrolyte in the aqueous solution is less than 0.3 parts by weight, the colloidal particles cannot be aggregated sufficiently. Consequently, it becomes difficult to form a granular material containing a metal oxide by settling out of aggregates in the aqueous solution. In order to ensure that a granular material containing a metal oxide is formed by settling out of aggregates, the aqueous solution is desirably one which contains an electrolyte added in an amount of 0.5 parts by weight or more per 100 parts by weight of water.

If colloidal particles of titanium oxide are contained as the metal oxide colloidal particles, a metal oxide-containing granular material in the form of flakes cannot be obtained in some cases since the colloidal particles of titanium oxide are less prone to aggregation. Metal oxide colloidal particles including colloidal particles of titanium oxide can be aggregated to some extent by increasing the concentration of the electrolyte in the aqueous solution. However, if the content of the titanium oxide colloidal particles in the metal oxide sol is relatively high, there is a limit to aggregating the metal oxide colloidal particles including the titanium oxide colloidal particles by increasing the concentration of one electrolyte in the aqueous solution since a single electrolyte has a limit to the solubility in water. With the use of an aqueous solution obtained by adding a plurality of electrolytes to water, metal oxide colloidal particles including colloidal particles of titanium oxide are more likely to aggregate into flakes. The combination of the plurality of electrolytes added to water is, for example, a combination of $NaNO_3$ and KCl. The combination of the plurality of electrolytes added to water may be, for example, a combination of $KNO_3$ and NaCl. The combination of the electrolytes added to water is not limited to these combinations, and the previously mentioned electrolytes may be optionally combined.

The aggregation of the metal oxide colloidal particles including colloidal particles of titanium oxide may be promoted by increasing the concentration of the electrolyte contained in the aqueous solution as well as increasing the temperature of the aqueous solution. This makes it more likely for the metal oxide colloidal particles including colloidal particles of titanium oxide to aggregate into flakes.

In order for the metal oxide colloidal particles to aggregate into flakes, the aqueous solution may contain a solvent that is soluble in water and that has a relative permittivity less than the relative permittivity of water (about 80). Due to interdiffusion between the solvent and water, the permittivity of the liquid-phase medium present between the metal oxide colloidal particles is reduced, and, accordingly, the electrical repulsion between the colloidal particles is also reduced. If this reduction in repulsion leads to a situation where the cohesive force derived from a universal attracting force acting between the colloidal particles is larger than the repulsion, the colloidal particles aggregate together. Since the aggregation of the colloidal particles in the aqueous solution can be promoted not only by the action of the electrolyte but also by the action of the solvent, it is possible to aggregate the metal oxide colloidal particles into flakes while limiting the concentration of the electrolyte contained in the aqueous solution.

For example, the solubility in water of the solvent contained in the aqueous solution is desirably 5 g/100 ml or more, and more desirably 8 g/100 ml or more. The solvent contained in the aqueous solution is, for example, a monovalent alcohol (which may include an ether bond) having two or more carbon atoms or a divalent alcohol having four or more carbon atoms. The solvent contained in the aqueous solution is, for example, an organic solvent such as methyl cellosolve, ethyl cellosolve, hexylene glycol, 1,3-butanediol, 2-butanol, 2-methyl-1-propanol, tert-butyl alcohol, 1-propanol, 2-propanol, and ethanol.

It is preferable to carry out the feed of the metal oxide sol into the aqueous solution in such a manner that the sol introduced is present in the form of droplets surrounded by the aqueous solution. The most reliable way to this end is to introduce the sol in the form of droplets, in other words, to add the sol dropwise. When the amount of the sol introduced per unit time needs to be increased in view of production efficiency, two or more liquid dropping devices may be used to add the sol dropwise into the solution. In a preferred embodiment of the present invention, the sol is added dropwise to the solution held in a container from two or more liquid dropping devices, preferably in a concurrent manner.

Even in the case where the sol is fed into the aqueous solution from an introduction pipe such as a tube, if a stress is applied to the fed sol, for example, by stirring the aqueous solution, the fed sol can be dispersed and present in the aqueous solution in the form of droplets. In this case, it is preferable to limit the inner diameter of the outlet of the introduction pipe to 5 mm or less, preferably to 2 mm or less, and, for example, to 0.1 mm to 1 mm. In a preferred embodiment of the present invention, the sol is fed into the aqueous solution via the introduction pipe while the aqueous solution is stirred, and the sol is dispersed in the aqueous solution in the form of droplets.

In some cases where the amount of the fed sol is too large relative to the amount of the aqueous solution, the colloidal particles become less prone to aggregation, and the yield of the aggregates is reduced. Therefore, the appropriate total amount of the fed sol is 30% by mass or less, preferably 25% by mass or less, and more preferably 20% by mass or less of the amount of the solution.

The size of the droplets of the sol to be fed also has an influence on the shape and size of the particles of the granular material. For obtaining a metal oxide-containing granular material in the form of thin flakes, it is advantageous that the droplets of the sol are small. If the droplets of the sol are too large, the variation in the sizes of the particles may be large. From this viewpoint, the size of each of the droplets of the sol is preferably 1 mg to 500 mg, and more preferably 1 mg to 50 mg.

The introduction of the droplets may be performed using a commonly-known liquid dropping device such as a dropper and a pipette. For mass production, the droplets may be continuously introduced using any of various dispensers. Commercially-available dropper or pipettes are not suitable for formation of large droplets; therefore, when a commercially-available dropper or pipette is used, it is recommended to process the tip of the dropper or pipette as appropriate. The droplets may be continuously introduced using any of the above-mentioned liquid dropping devises, and may be introduced from a plurality of liquid dropping devices in a concurrent manner.

Stirring of the aqueous solution during the feed of the metal oxide sol into the aqueous solution could influence the shapes of the particles of the granular material to be formed. Stirring of the aqueous solution elongates the aggregates, thus making it more likely to obtain a granular material in the form of flakes. As used herein, the term "flake" means a particle having the shape of a sheet whose principal faces can be regarded as flat faces or curved faces and in which the ratio of the diameter of each principal face to the thickness is 2 or more. Assuming a circle having an area equal to that of the principal surface, the diameter of the principal face corresponds to the diameter of the circle. The stirring of the solution may be performed using a commonly-known stirring device such as a magnetic stirrer or a stirring device equipped with a stirring blade and a shaft serving as a rotational axis.

A situation is assumed where 10 g of an aqueous $CaCl_2$ solution obtained by dissolving 0.5 parts by weight of $CaCl_2$ in 100 parts by weight of water is contained in a cylindrical container having an inner diameter of 22 mm. In this situation, a power required for rotating a stirring bar having a diameter of 7 mm and a length of 20 mm at a rotation speed of 1000 rpm is defined as P1. A required power for stirring per unit volume of the aqueous solution, which is determined by dividing P1 by the volume of the aqueous $CaCl_2$ solution, is defined as Q1. If, in stirring of the aqueous electrolyte solution, the power required per unit volume of the aqueous solution is equal to or larger than Q1, a granular material in the form of flakes is more likely to be obtained. This required power Q1 per unit volume of the aqueous solution can be determined, for example, as follows.

When the number of rotations of the stirring member is denoted by n [1/s], the power number is denoted by Np [–], the viscosity of the aqueous solution is denoted by $\rho$ [kg/m$^3$], and the diameter of the stirring member is denoted by d [m], the required power P [W] for stirring in a turbulent condition is represented by the following formula.

$$P = Np \cdot \rho \cdot n^3 \cdot d^5 \quad \text{(Formula 1)}$$

P can be determined, for example, by measuring the electric power of the motor that rotates the stirring member during stirring. Using the thus-determined P, Np can be experimentally determined by back calculation using the (Formula 1). In a turbulent condition, Np is approximately constant. Therefore, if Np can be experimentally found, a required power for stirring can be easily determined using the (Formula 1). Furthermore, a required power Q for stirring per unit volume of the aqueous solution can be determined by dividing the required power P for stirring determined in the (Formula 1) by the volume of the aqueous solution. In this manner, the required power Q1 per unit volume of the aqueous solution during the stirring under the aforementioned conditions can be determined.

It can be thought that the effects of stirring under two sets of conditions between which the required power Q for stirring per unit volume of the aqueous solution is equal are similar to each other. Therefore, it can be thought that, irrespective of the variation in the amount of the aqueous solution to be stirred, a granular material in the form of flakes is likely to be obtained if the aqueous solution is stirred under conditions where the required power for stirring is set so that the required power for stirring per unit volume of the aqueous solution is equal to or larger than Q1.

The type and the additive amount of the electrolyte could influence the shapes of the particles of the granular material to be formed. In particular, if the electrolyte is $CaCl_2$ and an aqueous solution containing $CaCl_2$ added in an amount of 0.2 to 2 parts by weight per 100 parts by weight of water is used, a granular material in the form of flakes is more likely to be obtained. By contrast, if an aqueous solution containing $CaCl_2$ added in an amount of more than 2 parts by weight per 100 parts by weight of water is used, a granular material in the form of blocks is generated. As used herein, the term "block" means a particle that has a blocky shape, that is not classified as having the shape of a flake, and in which the ratio of the maximum diameter to the minimum diameter is less than 2.

When an aqueous solution containing $CaCl_2$ added in an amount of more than 2 parts by weight per 100 parts by weight of water is used, it is desirable to stir the aqueous solution under conditions where the required power for stirring is such that the required power for stirring per unit volume of the aqueous solution is larger than Q1. For example, it is recommended to stir the aqueous solution under conditions where the required power for stirring is such that the required power for stirring per unit volume of the aqueous solution is equal to or larger than a required power Q2 for stirring per unit volume of the aqueous solution, the required power Q2 being defined under the following conditions.

<Required Power Q2 Per Unit Volume>

A situation is assumed where 3000 g of an aqueous $CaCl_2$ solution obtained by dissolving 5 parts by weight of $CaCl_2$ in 100 parts by weight of water is contained in a cylindrical container having an inner diameter of 50 mm. In this situation, a required power for rotating a stirring member having two blades each having a blade diameter of 45 mm and a blade width of 10 mm at a rotation speed of 2000 rpm is defined as P2. A required power for stirring per unit volume of the aqueous solution, which is determined by dividing P2 by the volume of the aqueous $CaCl_2$ solution, is defined as Q2.

If the electrolyte used is NaCl and its amount is equal to or more than 12 parts by weight per 100 parts by weight of water, a granular material in the form of flakes is more likely to be obtained. In this case, from the viewpoint of obtaining a granular material in the form of flakes, it is preferable to stir the aqueous solution under conditions where the required power is such that the required power per unit volume of the aqueous solution is equal to or larger than Q1.

After the end of the feed of the sol into the aqueous solution, the aggregates are separated from the aqueous solution. The separation of the aggregates can be performed by employing a commonly-known solid-liquid separation process such as filtration, centrifugation, and decantation. The aggregates separated from the aqueous solution are subjected to a drying treatment, and thus a metal oxide-containing granular material is obtained. The drying treatment may be natural drying. However, if the aggregates are dried by natural drying, there is a possibility that the aggregates undergo secondary aggregation. If the aggregates are dried by heating, the binding force between the particles constituting each aggregate can be enhanced. From these viewpoints, it is desirable to dry the aggregates by heating. For example, it is desirable to dry the aggregates by heating in an atmosphere having a temperature of 90° C. or higher. In order to increase the mechanical strength of the obtained granular material, the obtained granular material may be calcined.

If the aqueous solution is heated after the formation of the aggregates, the binding force between the particles constituting each aggregate is enhanced. Therefore, the method of the present invention may include a step of heating the aqueous solution after formation of the aggregates but before separating the aggregates. It is preferable to heat the aqueous solution to a temperature of, for example, 90° C. or higher, and the aqueous solution may be heated to boil.

The particles of the granular material obtained by the present invention generally have a maximum dimension of 500 In the case where the particle is in the shape of a flake, the diameter of the principal face of the particle is, for example, in the range of 1 to 500 and preferably in the range of 2 to 500 The thickness of the particle in the shape of a flake is, for example, 0.1 to 10 and preferably 0.2 to 2

In many of the commercially-available metal oxide sols that have a pH of 7 or higher and that can be used in the method of the present invention as a source of metal oxide, the cation contained is an alkali metal ion, particularly, sodium ion ($Na^+$). If such a commercially-available product is used, sodium ions are incorporated in the resulting granular material. Typically, the sodium concentration in the granular material is only 1 to 2% by mass in terms of oxide content (in terms of $Na_2O$ content). However, the allowable sodium concentration is lower for some particular uses such as use as a material for an electronic device. When it is necessary to meet such requirements, the sodium concentration can be reduced to a certain extent by washing with an acid such as hydrochloric acid; however, the addition of the washing step increases the production cost. Therefore, in the case where the sodium concentration should be low, it is preferable to use a metal oxide sol whose major cation is an ion other than alkali metal ions, such as ammonium ion ($NH_4^+$). As used herein, the term "major cation" means a cation whose content by mass is the largest.

A functional material may be added beforehand to the metal oxide sol. Examples of the functional material include materials that function as at least one selected from a water-repellent agent, an antibacterial agent, an ultraviolet absorber, an infrared absorber, a coloring matter, an electric conductor, a heat conductor, a fluorescent material, and a catalyst. As used herein, the term "heat conductor" means a material having a higher thermal conductivity than any of the oxides such as silicon oxide and tin oxide listed above as constituent oxides of the metal oxide colloidal particles. In addition, the term "catalyst" used herein is intended to include photocatalysts. It should be noted that some functional materials may exert a plurality of functions. For example, titanium oxide (titania) is a material that functions as an ultraviolet absorber and a catalyst (photocatalyst), and carbon black is a material that functions as a coloring matter, an electric conductor, and a heat conductor.

Examples of the functional material are listed below.

Water repellent agent: fluoroalkylsilane compounds, alkylsilane compounds, and fluororesins.

Antibacterial agent: silver, copper, silver compounds, copper compounds, zinc compounds, quaternary ammonium salts, and alkyldiaminoethylglycine hydrochloride.

Ultraviolet absorber: titanium oxide, zinc oxide, cerium oxide, iron oxide, cinnamic acid compounds, para-aminobenzoic acid compounds, benzophenone compounds, benzotriazole compounds, salicylic acid compounds, phenol triazine compounds, alkyl benzoate compounds, aryl benzoate compounds, cyanoacrylate compounds, dibenzoylmethane compounds, chalcone compounds, and camphor compounds.

Infrared absorber: antimony-doped tin oxide, tin-doped indium oxide, diimmonium compounds, phthalocyanine compounds, benzenedithiol metallic compounds, anthraquinone compounds, and aminothiophenolate metallic compounds.

Coloring matter: microcrystalline cellulose; inorganic white pigments such as titanium dioxide and zinc oxide; inorganic red pigments such as iron oxide (colcothar) and iron titanate; inorganic brown pigments such as γ-iron oxide; inorganic yellow pigments such as yellow iron oxide and ocher; inorganic black pigments such as black iron oxide and carbon black; inorganic purple pigments such as manganese violet and cobalt violet; inorganic green pigments such as chromium oxide, chromium hydroxide, and cobalt titanate; inorganic blue pigments such as ultramarine and Prussian blue; metal powder pigments such as aluminum powder and copper powder; organic pigments such as Red No. 201, Red No. 202, Red No. 204, Red No. 205, Red No. 220, Red No. 226, Red No. 228, Red No. 405, Orange No. 203, Orange No. 204, Yellow No. 205, Yellow No. 401, and Blue No. 404; organic pigments such as zirconium lakes, barium lakes, and aluminum lakes of Red No. 3, Red No. 104, Red No. 106, Red No. 227, Red No. 230, Red No. 401, Red No. 505, Orange No. 205, Yellow No. 4, Yellow No. 5, Yellow No. 202, Yellow No. 203, Green No. 3, and Blue No. 1; and natural dyes such as cochineal dye, lac dye, monascus dye, monascus yellow dye, gardenia red dye, gardenia yellow dye, safflower red dye, safflower yellow dye, beet red, turmeric dye, red cabbage dye, chlorophyll, β-carotene, spirulina dye, and cacao dye.

Electric conductor: metals such as copper, gold, and platinum; and metal oxides such as tin oxide, antimony-doped tin oxide, tin-doped indium oxide, metal-doped zinc oxide, and metal-doped titanium oxide.

Heat conductor: metals such as copper, boron nitride, aluminum nitride, silicon nitride, diamond, carbon nanotube, carbon black, and graphite.

Fluorescent material: fluorescein dyes, pyrazine dyes, coumarin dyes, naphthalimide dyes, triazine dyes, oxazine dyes, dioxazine dyes, rhodamine dyes, sulforhodamine dyes, azo compounds, azomethine compounds, stilbene derivatives, oxazole derivatives, benzoxazole dyes, imidazole dyes, pyrene dyes, terbium-activated gadolinium oxide, calcium tungstate fluorescent materials, europium-activated barium chlorofluoride fluorescent materials, and zinc oxide fluorescent materials.

Catalyst: platinum, palladium, rhodium, iridium, ruthenium, iron oxide, gold, metal complexes, titanium oxide, zinc oxide, cadmium sulfide, and tungsten oxide.

If a functional material is added, the resulting granular material contains the functional material as well as the metal oxide. According to the present invention, it is possible to obtain a granular material that contains a functional material but has a low proportion of the functional material exposed to the outside. In the method of the present invention, the metal oxide colloidal particles form into aggregates while incorporating the functional material. Thus, a granular material in which the functional material is uniformly dispersed can be obtained. For example, if particles of titanium oxide are used as the functional material, the resulting granular material containing titanium oxide is thought to exhibit high ultraviolet-shielding ability and high photocatalytic effect.

EXAMPLES

Methods of evaluation of the examples will be described before specifically describing the examples.

<Occurrence or Nonoccurrence of Settling Out of Aggregates>

In the examples and comparative examples, whether or not settling out of aggregates occurred was evaluated by visually inspecting the state of the aqueous electrolyte solution after the end of the feed of the silica sol. A case where the aqueous electrolyte solution after the feed of the silica sol was free from turbidity and able to be considered transparent was rated as "Settle out". A case where turbidity was found in the aqueous electrolyte solution after the feed of the silica sol was rated as "Not settle out".

<Observation of Forms of Granular Materials>

Observation of the forms of granular materials obtained in the examples and comparative examples described below was performed using a SEM (scanning electron microscope). The shapes of the particles of the granular materials in the examples and comparative examples were classified as those of flakes or blocks based on the previously-described definitions, and the examples in which the number of particles in the shape of a flake accounted for 70% or more of the total number of the particles were rated as "Flakes".

Example 1

An aqueous electrolyte solution was obtained by dissolving 0.5 parts by weight of $CaCl_2$ in 100 parts by weight of water. An amount of 10 g of the aqueous electrolyte solution obtained was put into a cylindrical container having an inner diameter of 22 mm. An amount of 0.2 g of a silica sol ("SILICADOL 30S" manufactured by Nippon Chemical Industrial Co., Ltd.) was fed by dropwise addition at a rate of 1 g/minute to the aqueous electrolyte solution having a temperature of 20° C.±5° C. During the period in which the silica sol was fed to the aqueous electrolyte solution, the aqueous electrolyte solution was stirred by a magnetic stirrer (stirring bar: diameter=7 mm, length=20 mm) rotated at a rotation speed of 1000 rpm. After the end of the feed of the silica sol, the stirring was stopped. It was visually confirmed that aggregates settled out in the aqueous electrolyte solution. Also, it was visually confirmed that the aqueous electrolyte solution was free from turbidity and was transparent. Thereafter, the aqueous electrolyte solution was heated to boil. The heating of the aqueous electrolyte solution was stopped, and then the aqueous electrolyte solution was filtered using a filter paper (aperture=1 μm) to separate the solids including the aggregates having settled out from the aqueous electrolyte solution. These solids were dried to obtain a metal oxide-containing granular material. The mass of the granular material obtained was 90% by mass or more of the solids contained in the silica sol.

Examples 2 to 5

Granular materials of Example 2 to Example 5 were obtained by setting the added amounts of $CaCl_2$ as shown in Table 1 and performing the same procedures as in Example 1. Also in Example 2 to Example 5, the weight of the obtained granular material was 90% by mass or more of the solids contained in the silica sol.

Comparative Example 1 and Comparative Example 2

In Comparative Example 1 and Comparative Example 2, the added amounts of $CaCl_2$ were set as shown in Table 1, and a silica sol was fed into an aqueous electrolyte solution in the same manner as in Example 1. In Comparative Example 1 and Comparative Example 2, when the aqueous electrolyte solution after the feed of the silica sol was visually observed, the aqueous electrolyte solution was found to be turbid. Thereafter, the aqueous electrolyte solution was filtered using a filter paper (aperture=1 μm) to separate the solids from the aqueous electrolyte solution. Furthermore, these solids were dried. The mass of the dried solids was less than 90% by mass of the solids contained in the silica sol. For example, in Comparative Example 2, the mass of the dried solids was 73% by mass of the solids contained in the silica sol.

Examples 6 to 8

Aqueous electrolyte solutions were each obtained by setting the amount of $CaCl_2$ added per 100 parts by weight of water as shown in Table 2. An amount of 3000 g of each aqueous electrolyte solution obtained was put into a cylindrical container having an inner diameter of 50 mm. An amount of 100 g of a silica sol ("SILICADOL 30S" manufactured by Nippon Chemical Industrial Co., Ltd.) was fed by dropwise addition at a rate of 1 g/minute to the aqueous electrolyte solution. During the period in which the silica sol was fed to the aqueous electrolyte solution, the aqueous electrolyte solution was stirred by a stirring member rotated at a rotation speed of 2000 rpm, the stirring member having two blades each having a blade diameter of 45 mm and a blade width of 10 mm. The same procedures as in Example 1 except for the above were performed to obtain granular materials of Examples 6 to 8. The mass of each granular material obtained was 90% by mass or more of the solids contained in the silica sol.

Example 9 to 19

Granular materials of Examples 9 to 19 were obtained by changing the type and amount of the electrolyte used as shown in Table 3 and performing the same procedures as in Example 1. The mass of each granular material obtained was 90% by mass or more of the solids contained in the silica sol. It should be noted that in Example 19, the temperature of the aqueous electrolyte solution at the time of the dropwise addition of the sol solution was set to about 60° C.

Example 20

A sol solution was obtained by mixing 90% by mass of a silica sol ("SILICADOL 30S" manufactured by Nippon Chemical Industrial Co., Ltd.) and 10% by mass of an aqueous dispersion of titanium oxide fine particles ("MT-100AQ" manufactured by Tayca Corporation: titanium oxide concentration=30% by mass). An amount of 0.2 g of this sol solution was fed by dropwise addition at a rate of 1 g/minute to 10 g of an aqueous electrolyte solution obtained by adding 30 parts by weight of NaCl to 100 parts by weight of water, and the same procedures as in Example 1 were performed to obtain a granular material of Example 20. The mass of the granular material obtained was 90% by mass or more of the solids contained in the sol solution.

Examples 21 to 23

A sol solution was obtained by mixing 80% by mass of a silica sol ("SILICADOL 30S" manufactured by Nippon Chemical Industrial Co., Ltd.) and 20% by mass of an aqueous dispersion of titanium oxide fine particles ("MT-100AQ" manufactured by Tayca Corporation: titanium oxide concentration=30% by mass). An amount of 0.2 g of this sol solution was fed by dropwise addition at a rate of 1 g/minute to 10 g of each of the aqueous electrolyte solutions obtained by adding electrolytes shown in Table 4, and the same procedures as in Example 1 were performed to obtain granular materials of Examples 21 to 23. In Example 21 and Example 22, the temperature of the aqueous electrolyte solution at the time of the dropwise addition of the sol solution was set to 20° C.±5° C. In Example 23, the temperature of the aqueous electrolyte solution at the time of the dropwise addition of the sol solution was set to about 100° C. The mass of each granular material obtained was 90% by mass or more of the solids contained in the sol solution.

Example 24

A granular material of Example 24 was obtained in the same manner as in Example 1, except for using an aqueous electrolyte solution obtained by dissolving 10 parts by weight of NaCl as an electrolyte in 100 parts by weight of water. The mass of the granular material obtained was 90% by mass or more of the solids contained in the sol solution.

Example 25 to Example 34

Granular materials of Example 25 to Example 34 were obtained in the same manner as in Example 1, except for using aqueous electrolyte solutions obtained by dissolving 10 parts by weight of NaCl as an electrolyte and 10 parts by weight of each of the solvents shown in Table 5 in 100 parts by weight of water. The mass of each granular material obtained was 90% by mass or more of the solids contained in the sol solution.

Table 1 to Table 5 show the results of evaluation of the forms of the obtained granular materials or evaluation of occurrence or nonoccurrence of settling out of aggregates for the examples and comparative examples.

TABLE 1

| | Amount of $CaCl_2$ added per 100 parts by weight of water [parts by weight] | Form of granular material/ Occurrence or nonoccurrence of settling out |
|---|---|---|
| Example 1 | 0.5 | Flakes |
| Example 2 | 1 | Flakes |
| Example 3 | 3 | Blocks, Flakes |
| Example 4 | 5 | Blocks, Flakes |
| Example 5 | 10 | Blocks, Flakes |

TABLE 1-continued

| | Amount of CaCl₂ added per 100 parts by weight of water [parts by weight] | Form of granular material/ Occurrence or nonoccurrence of settling out |
|---|---|---|
| Comp. Example 1 | 0.1 | Not settle out |
| Comp. Example 2 | 0.2 | Not settle out |

TABLE 2

| | Amount of CaCl₂ added per 100 parts by weight of water [parts by weight] | Form of granular material |
|---|---|---|
| Example 6 | 5 | Flakes |
| Example 7 | 20 | Flakes |
| Example 8 | 70 | Flakes |

TABLE 3

| | Type of electrolyte | Amount of electrolyte added per 100 parts by weight of water [parts by weight] | Form of granular material |
|---|---|---|---|
| Example 9 | NaCl | 15 | Flakes |
| Example 10 | NaCl | 20 | Flakes |
| Example 11 | NaCl | 25 | Flakes |
| Example 12 | NaCl | 30 | Flakes |
| Example 13 | CH₃COONa | 30 | Flakes |
| Example 14 | NaNO₃ | 80 | Flakes |
| Example 15 | KCl | 30 | Flakes |
| Example 16 | (CH₃COO)₂Mg•4H₂O | 10 | Flakes |
| Example 17 | NaCl | 10 | Flakes |
| | CaCl₂ | 2 | |
| Example 18 | KNO₃ | 30 | Blocks |
| Example 19 | KNO₃ | 90 | Flakes |

TABLE 4

| | Type of electrolyte | Amount of electrolyte added per 100 parts by weight of water [parts by weight] | Temperature of aqueous electrolyte solution at the time of dropwise addition | Form of granular material |
|---|---|---|---|---|
| Example 21 | NaNO₃ | 90 | 20° C. ± 5° C. | Blocks |
| Example 22 | NaNO₃ | 90 | 20° C. ± 5° C. | Flakes |
| | KCl | 30 | | |
| Example 23 | NaNO₃ | 170 | About 100° C. | Flakes |

TABLE 5

| | Type of solvent | Amount of solvent added per 100 parts by weight of water [parts by weight] | Relative Permittivity of solvent | Solubility of solvent [g/ml] | Form of granular material |
|---|---|---|---|---|---|
| Example 24 | — | — | — | — | Blocks |
| Example 25 | Methyl cellosolve | 10 | 17 | Freely miscible | Flakes |
| Example 26 | Ethyl cellosolve | 10 | 14 | Freely miscible | Flakes |
| Example 27 | Hexylene glycol | 10 | 25 | Freely miscible | Flakes |
| Example 28 | 1,3-butanediol | 10 | 28 | Freely miscible | Flakes |
| Example 29 | 2-butanol | 10 | 16 | 12.5 | Flakes |
| Example 30 | 2-methyl-1-propanol | 10 | 18 | 8.5 | |
| Example 31 | Tert-butyl alcohol | 10 | 11 | Freely miscible | Flakes |
| Example 32 | 1-propanol | 10 | 22 | Freely miscible | Flakes |
| Example 33 | 2-propanol | 10 | 18 | Freely miscible | Flakes |
| Example 34 | Ethanol | 10 | 24 | Freely miscible | Flakes |

In Comparative Example 1 and Comparative Example 2, turbidity was observed in the aqueous electrolyte solution after the feed of the silica sol; therefore, Comparative Example 1 and Comparative Example 2 were rated as "Not settle out" as shown in Table 1. By contrast, in Examples 1 to 19, the aqueous electrolyte solution after the feed of the silica sol was almost free from turbidity and able to be considered transparent; therefore, Examples 1 to 19 were rated as "Settle out". In addition, in Examples 1 to 19, the settling out of aggregates was visually confirmed in the aqueous electrolyte solution after the feed of the silica sol.

As indicated by Comparative Example 1 and Comparative Example 2, no aggregates settled out when the amount of $CaCl_2$ added was less than 0.3 parts by weight per 100 parts by weight of water. Therefore, in order to obtain a granular metal oxide material by causing aggregates of the metal oxide to completely settle out, the amount of $CaCl_2$ added needs to be 0.3 parts by weight or more per 100 parts by weight of water. It can be found from Examples 1 to 5 that when the amount of $CaCl_2$ added is 0.3 parts by weight or more per 100 parts by weight of water, aggregates of a metal oxide completely settle out so that a granular material containing the metal oxide is obtained. The amount of $CaCl_2$ added is preferably 0.5 parts by weight or more per 100 parts by weight of water.

Figure 2:
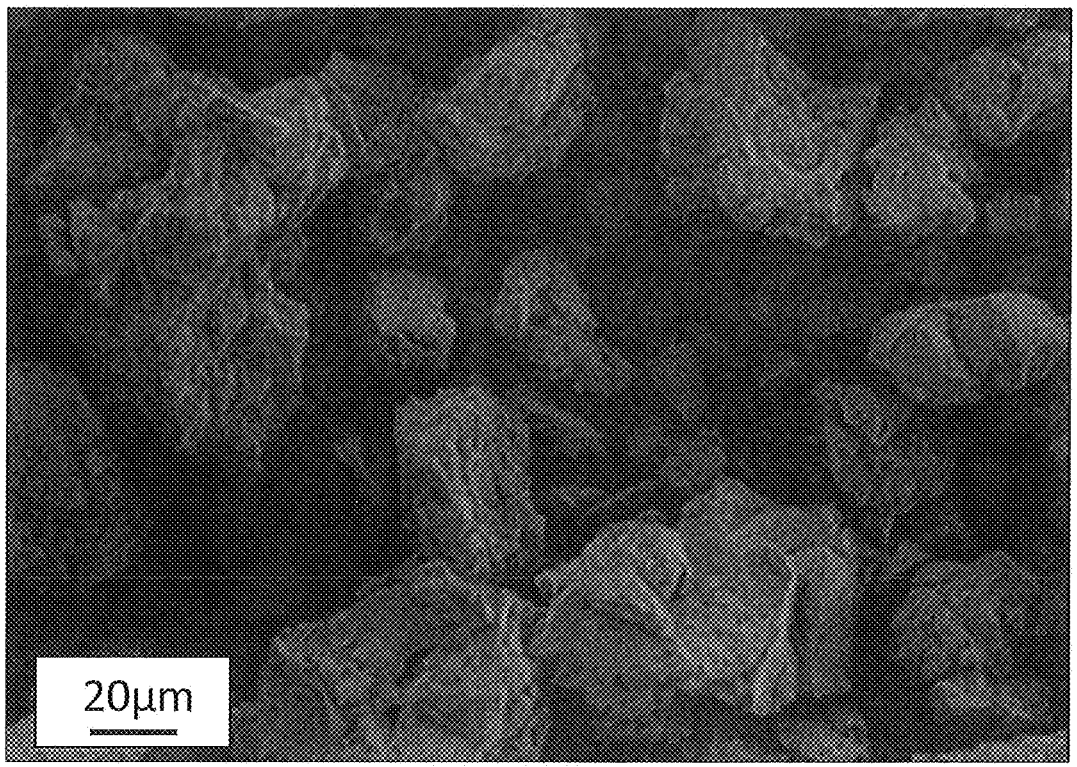
FIG. 2 is a photograph of a granular material according to Example 5 taken by a SEM.

A SEM photograph of the granular material according to Example 1 is shown in FIG. 1, and a SEM photograph of the granular material according to Example 5 is shown in FIG. 2. In Examples 1 to 5, a granular material in the form of flakes was obtained when the amount of $CaCl_2$ added was 0.3 to 2 parts by weight per 100 parts by weight of water, while when the amount of $CaCl_2$ added was more than 2 parts by weight per 100 parts by weight of water, a granular material in the form of blocks was formed. Therefore, in order to increase the proportion of a granular material that is in the form of flakes, the amount of $CaCl_2$ added is desirably 0.3 to 2 parts by weight, more desirably 0.5 to 2 parts by weight, and even more desirably 0.5 to 1 part by weight, per 100 parts by weight of water.

Figure 3:
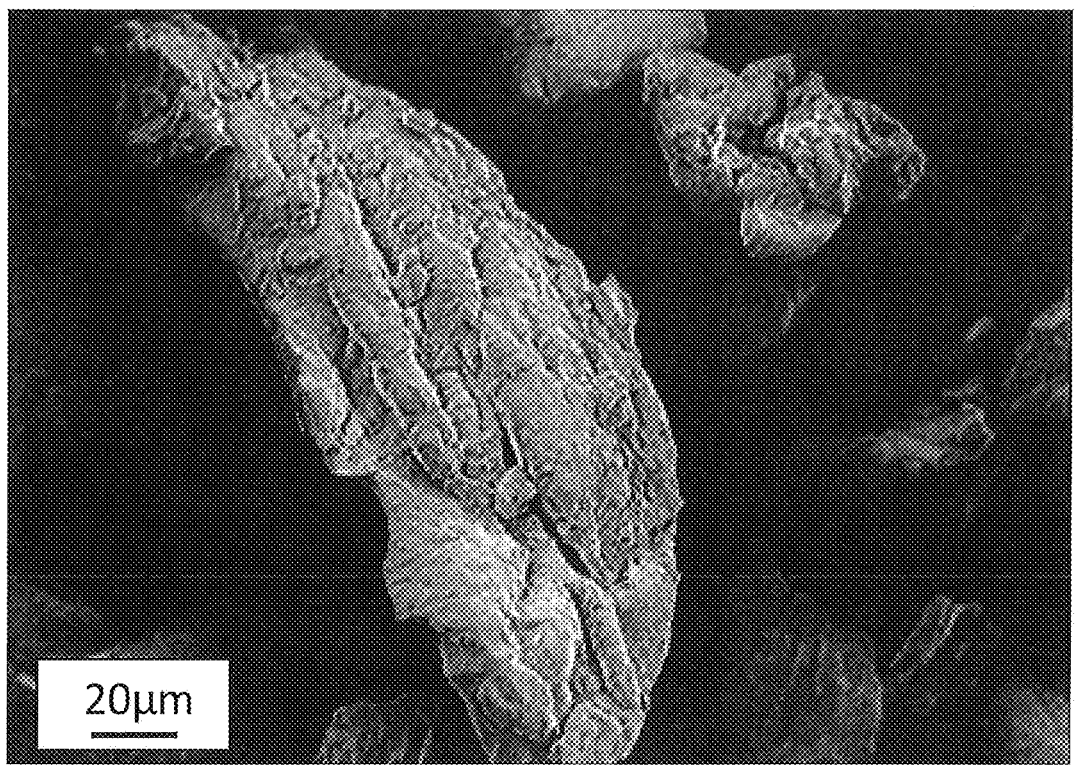
FIG. 3 is a photograph of a granular material according to Example 8 taken by a SEM.
Figure 4:
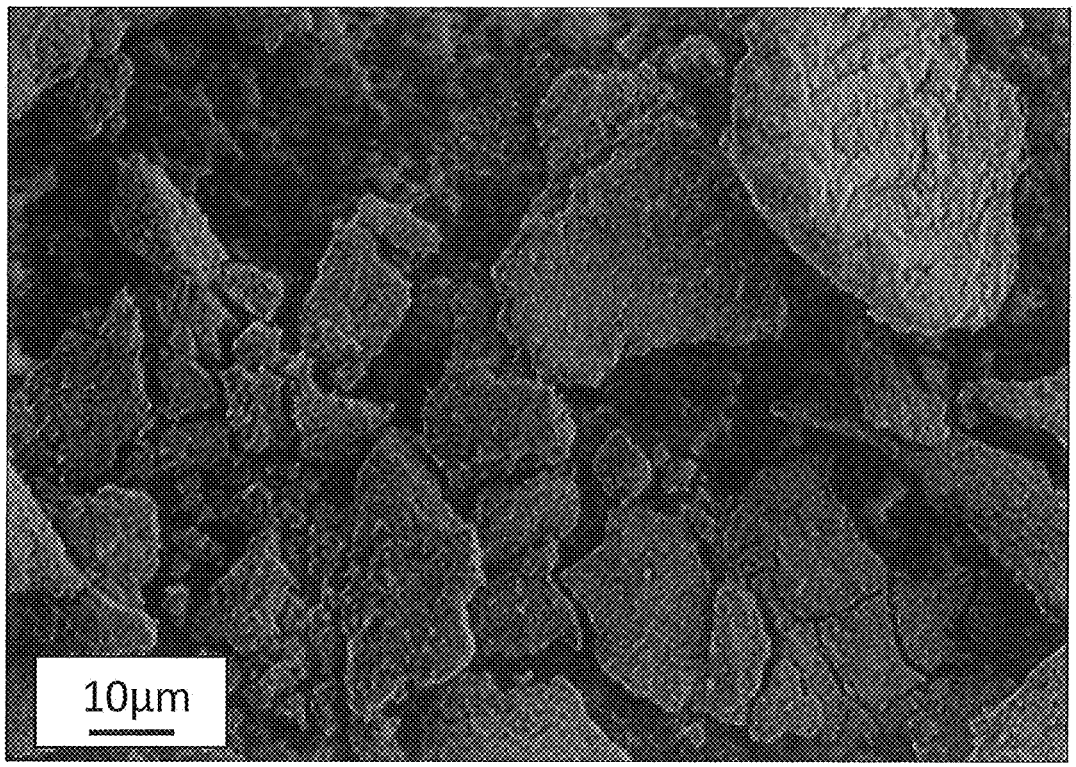
FIG. 4 is a photograph of a granular material according to Example 11 taken by a SEM.
Figure 5:
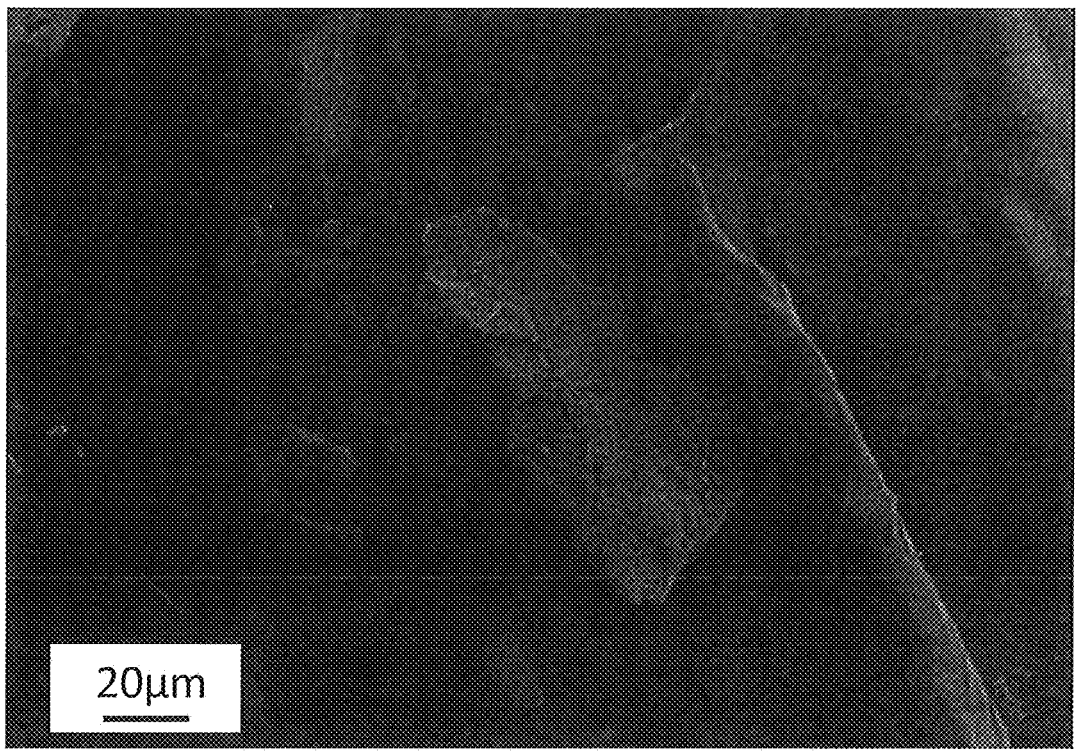
FIG. 5 is a photograph of a granular material according to Example 13 taken by a SEM.
Figure 6:
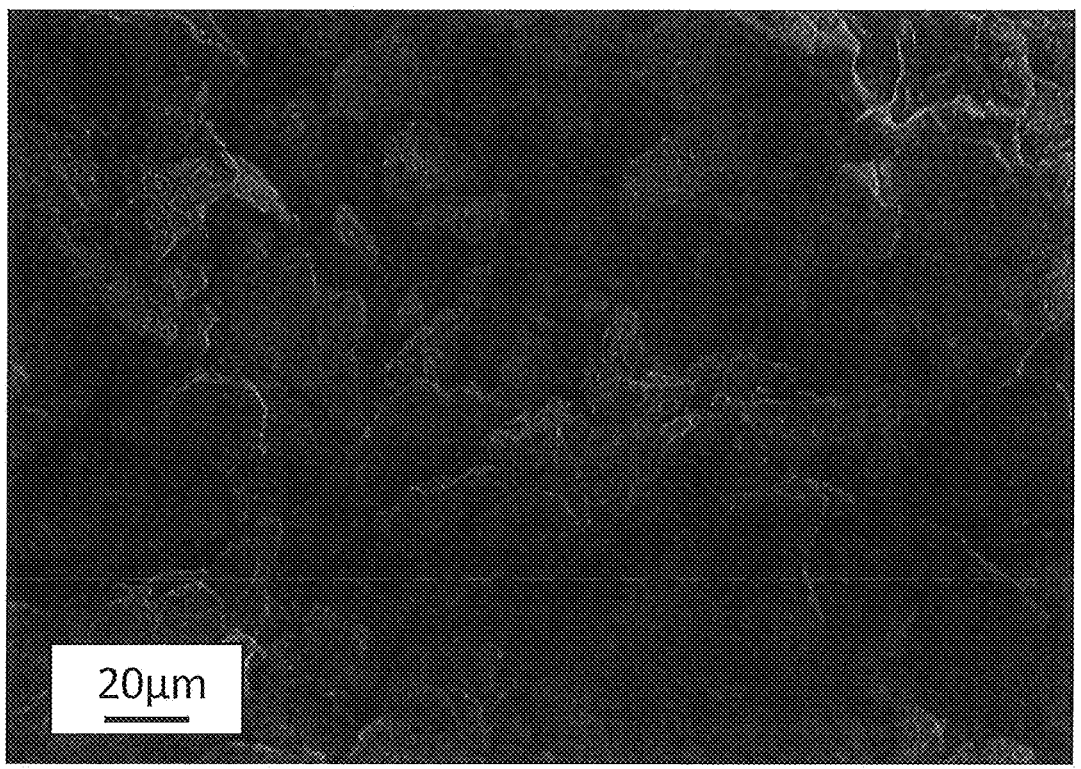
FIG. 6 is a photograph of a granular material according to Example 14 taken by a SEM.
Figure 7:
FIG. 7 is a photograph of a granular material according to Example 15 taken by a SEM.
Figure 8:
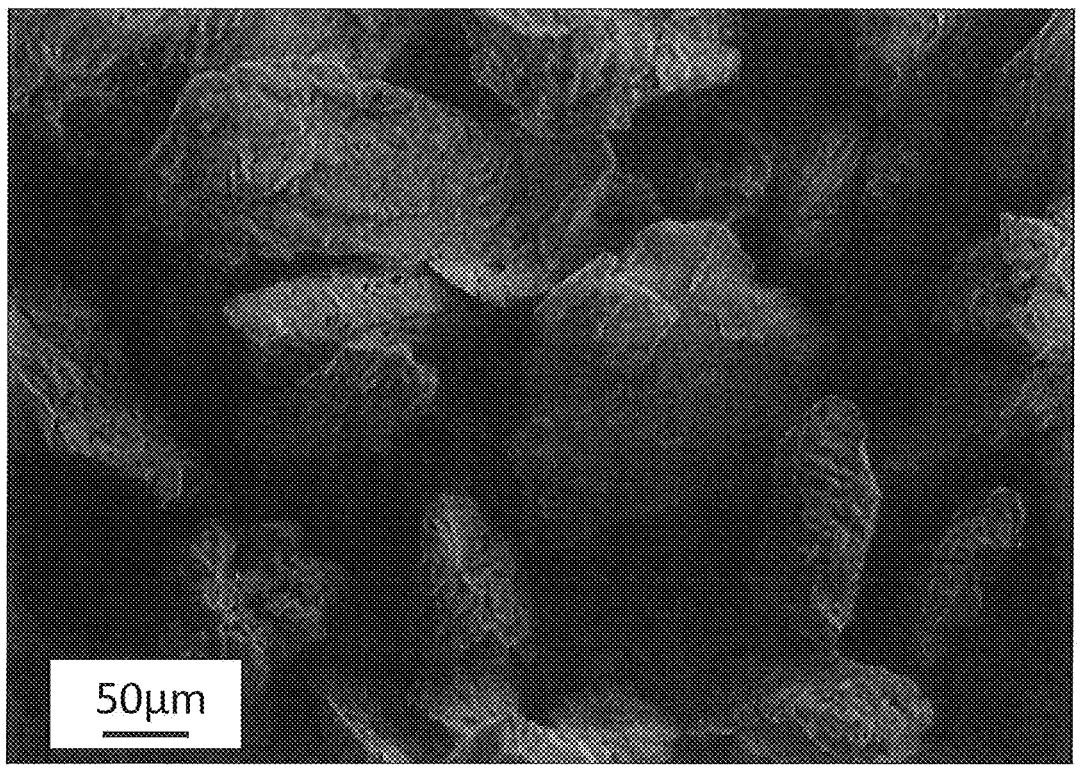
FIG. 8 is a photograph of a granular material according to Example 16 taken by a SEM.
Figure 9:
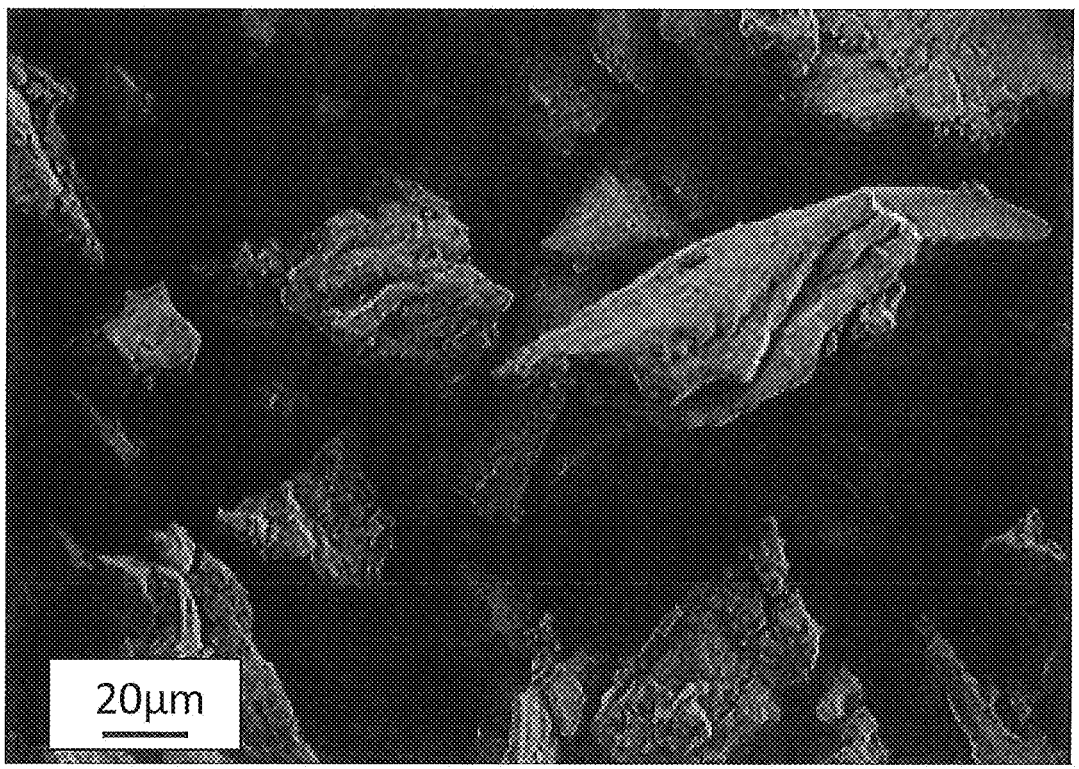
FIG. 9 is a photograph of a granular material according to Example 17 taken by a SEM.

A SEM photograph of the granular material according to Example 8 is shown in FIG. 3. As indicated by Examples 6 to 8, increasing the required power for stirring per unit volume of the aqueous electrolyte solution in the stirring of the aqueous solution makes it more likely to obtain a granular material in the form of flakes even when the amount of $CaCl_2$ added is more than 2 parts by weight per 100 parts by weight of water. Therefore, when the amount of $CaCl_2$ added is more than 2 parts by weight per 100 parts by weight of water, it is desirable to stir the aqueous solution under conditions where the required power for stirring per unit volume of the aqueous solution is larger than Q1 described above.

SEM photographs of the granular materials according to Example 11 and Examples 13 to 17 are shown in FIG. 4 to FIG. 9. As shown in Table 3 and FIG. 4 to FIG. 9, granular materials in the form of flakes were able to be obtained also by the use of electrolytes other than $CaCl_2$. As indicated by Example 17, a granular material in the form of flakes was able to be obtained also when two types of electrolytes were mixed. The granular material according to Example 18 was not in the form of flakes but in the form of blocks. By contrast, the granular material according to Example 19 was in the form of flakes. This demonstrated that a granular metal oxide material in the form of flakes can be obtained by increasing the concentration of the electrolyte contained in the aqueous solution as well as increasing the temperature of the aqueous solution.

Figure 10:
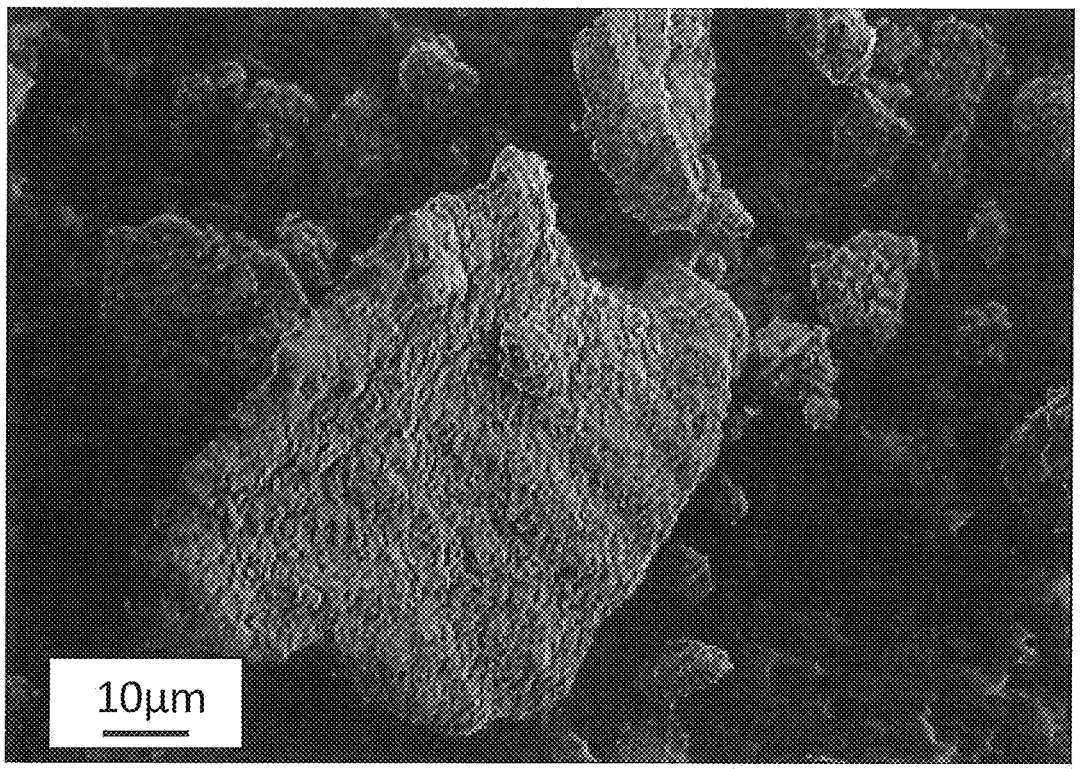
FIG. 10 is a photograph of a granular material according to Example 20 taken by a SEM.

A SEM photograph of the granular material according to Example 20 is shown in FIG. 10. As shown in FIG. 10, a granular metal oxide material including titanium oxide particles was able to be obtained. A portion of the granular material according to Example 20 was in the form of flakes. When the cohesive force between the particles constituting each of the particles of the granular material is weak, wrinkles as shown in FIG. 10 are likely to be observed on the surfaces of the particles of the granular material. The occurrence of wrinkles as shown in FIG. 10 on the surfaces of the particles of the granular material according to Example 20 is thought to be due to the weak cohesive force between titanium oxide particles. That is, a portion of the granular material according to Example 20 is thought to include titanium oxide particles.

The granular material according to Example 21 was in the form of blocks. The solubility of $NaNO_3$ in water at 25° C. is 92.1 g/100 ml; that is, the aqueous electrolyte solution used in Example 21 was nearly in a saturated state. The granular material according to Example 22 was in the form of flakes. It was demonstrated that a granular metal oxide material in the form of flakes can be obtained by using an aqueous electrolyte solution obtained by adding a plurality of electrolytes. The granular material according to Example 23 was in the form of flakes. It was demonstrated that a granular metal oxide material in the form of flakes can be obtained by increasing the concentration of an electrolyte in an aqueous electrolyte solution as well as increasing the temperature of the aqueous electrolyte solution at the time of dropwise addition of a sol solution.

The granular material according to Example 24 was in the form of blocks. By contrast, the granular materials according to Example 25 to Example 34 were in the form of flakes. This demonstrated that a granular metal oxide material in the form of flakes can be obtained by using an aqueous electrolyte solution obtained by adding not only an electrolyte but also a water-soluble solvent having a permittivity lower than the permittivity of water.

The silica sol used in the examples and comparative examples described above ("SILICADOL 30S" manufactured by Nippon Chemical Industrial Co., Ltd.) contains sodium ion ($Na^+$) as a major cation. However, a granular material containing a metal oxide can be obtained by using a silica sol containing ammonium ion ($NH_4^+$) as a major cation. Examples of the silica sol containing ammonium ion ($NH_4^+$) as a major cation include "SNOWTEX N" manufactured by Nissan Chemical Industries, Ltd.

The invention claimed is:

1. A method for producing a granular material containing a metal oxide, comprising the steps of:
    feeding a metal oxide sol that contains colloidal particles of a metal oxide as a dispersoid and water as a dispersion medium and that has a pH of 7 or higher, into an aqueous electrolyte solution, so as to aggregate the colloidal particles of the metal oxide, form aggregates containing the metal oxide in the aqueous electrolyte solution, and make the aggregates settle out in the aqueous electrolyte solution; and
    separating the aggregates from the aqueous electrolyte solution after formation of the aggregates,
    wherein the aqueous electrolyte solution comprises the electrolyte added in an amount of 0.3 parts by weight or more per 100 parts by weight of water.

2. The method for producing a granular material according to claim 1, wherein the metal oxide sol is fed into the aqueous electrolyte solution in the form of droplets.

3. The method for producing a granular material according to claim 1, further comprising a step of heating the aqueous electrolyte solution after formation of the aggregates but before separating the aggregates.

4. The method for producing a granular material according to claim 1, further comprising a step of drying the separated aggregates by heating.

5. The method for producing a granular material according to claim 1, wherein the electrolyte comprises at least one selected from NaCl, CaCl$_2$, CH$_3$COONa, NaNO$_3$, KCl, (CH$_3$COO)$_2$Mg.4H$_2$O, and KNO$_3$.

6. The method for producing a granular material according to claim 1, wherein the aqueous electrolyte solution comprises a solvent soluble in water and having a relative permittivity less than a relative permittivity of water.

7. The method for producing a granular material according to claim 1, wherein in the step for formation of the aggregates, the metal oxide sol is fed into the aqueous electrolyte solution while the aqueous electrolyte solution is stirred.

8. The method for producing a granular material according to claim 1, wherein the electrolyte is CaCl$_2$, and the amount of the CaCl$_2$ added is 0.3 to 2 parts by weight per 100 parts by weight of water.

9. The method for producing a granular material according to claim 1, wherein at least a portion of the granular material is in the form of flakes.

10. The method for producing a granular material according to claim 1, wherein the metal oxide sol comprises titanium oxide particles, and the granular material comprises the titanium oxide particles.

11. The method for producing a granular material according to claim 10, wherein the electrolyte comprises NaNO$_3$ and KCl.

\* \* \* \* \*